United States Patent [19]

Yuan

[11] 4,409,798

[45] Oct. 18, 1983

[54] ENERGY-SAVING COOLING SYSTEM

[76] Inventor: Shao W. Yuan, 6701 Montour Dr., Falls Church, Va. 22043

[21] Appl. No.: 297,263

[22] Filed: Aug. 28, 1981

Related U.S. Application Data

[63] Continuation-in-part of Ser. No. 218,800, Dec. 22, 1980, Pat. No. 4,346,569, which is a continuation-in-part of Ser. No. 951,518, Oct. 13, 1978, Pat. No. 4,240,268.

[51] Int. Cl.³ ............................................. F25D 23/12
[52] U.S. Cl. ......................................... 62/260; 165/45
[58] Field of Search .......................... 62/260; 165/45; 126/400

[56] References Cited

U.S. PATENT DOCUMENTS

| | | | |
|---|---|---|---|
| 213,138 | 3/1879 | Shepard | 62/260 X |
| 1,297,633 | 3/1919 | Ashley | 62/260 X |
| 2,829,504 | 4/1958 | Schlichtig | 62/260 X |
| 3,952,531 | 4/1976 | Turner | 62/260 X |
| 4,011,736 | 3/1977 | Harrison | 62/260 |
| 4,258,780 | 3/1981 | Suo | 62/260 X |
| 4,277,946 | 7/1981 | Bottom | 62/260 X |

FOREIGN PATENT DOCUMENTS 956062  1/1950  France .................... 62/260

Primary Examiner—Lloyd L. King
Attorney, Agent, or Firm—William H. Holt

[57] ABSTRACT

A system for transmitting, storing and utilizing cold which includes the use of either natural cold ambient air or mechanical refrigeration equipment for transmitting cold air to freeze water in containers installed in the cold storage chamber. When an air-conditioning system in a cooling environment is in operation, air in the air-conditioning duct will be circulated through the cold storage chamber and then returned to the duct for cooling requirements. The system provides for seasonal cold storage which can be effectively and efficiently used during the warm seasons for space cooling and cold storage.

4 Claims, 2 Drawing Figures

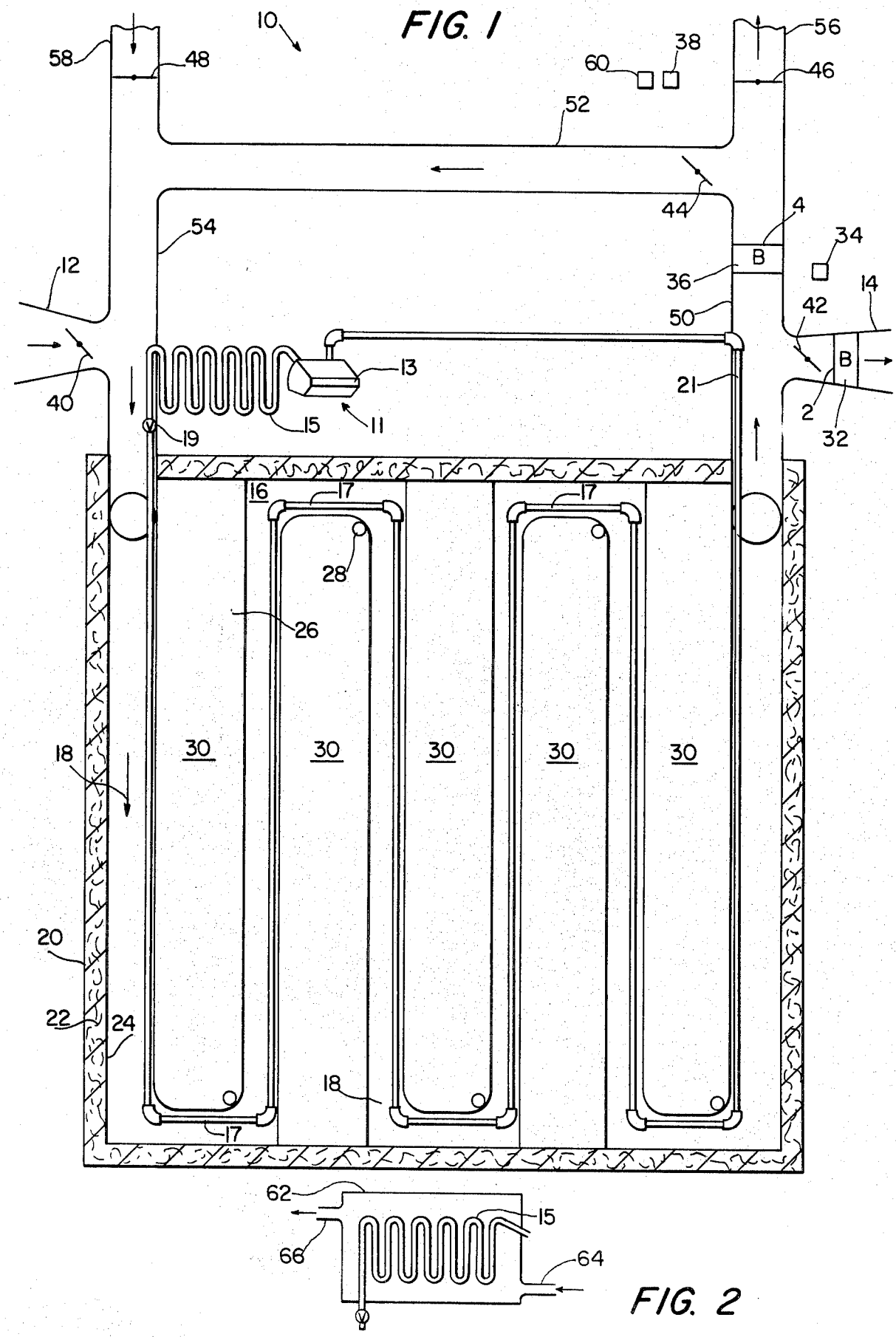

ENERGY-SAVING COOLING SYSTEM

This is a continuation-in-part of my pending application Ser. No. 06/218,800, filed Dec. 22, 1980, and now U.S. Pat. No. 4,346,569, granted on Aug. 31, 1982, which is a continuation-in-part of application Ser. No. 951,518, filed Oct. 13, 1978, and now U.S. Pat. No. 4,240,268, granted on Dec. 23, 1980.

BACKGROUND OF THE INVENTION

1. Field of Invention

The present invention relates to utilization of natural cold ambient air and mechanical refrigeration, and more particularly to method and system for transmitting and storing cold medium during cold seasons, preferably underground, for effective uses during summer seasons.

2. Description of the Prior Art

Prior art ground cold storage is generally accomplished by blowing winter cold ambient air through a cold reservoir formed by a bed of crushed stones and rocks. In other cases, cold liquid medium is pumped through pipes embedded in stone and rock medium in the form of a closed heat-exchange system.

The stones and rocks, as a cold storage reservoir, have several shortcomings. First, cold storage capacities are limited because of the narrow temperature range for cooling. In other words, the difference of storage temperature in winter and upper-limit useful temperatures in summer is less than thirty degrees Fahrenheit (30° F. to 60° F.). For example, in a volume of one cubic foot of stone at a temperature difference of 30° F., the energy flux is about $1.3 \times 10^3$ BTU. Assuming a summer requirement of $25 \times 10^6$ BTU for an average size home, a volume of cold storage required for cooling is estimated at $20 \times 10^3$ cubic feet. In contrast to this large volume, if ice is used for cold storage instead of rocks, the required storage volume is only about $2.5 \times 10^3$ cubic feet. Ice changes from liquid to solid, or vice versa, at 32° F. with liberation or absorption, respectively, at 143 BTU per pound of ice.

Another shortcoming of the stones and rocks as cold storage is the low thermal conductivity. It would require a long length of liquid pipes considerable pumping power in order to meet the maximum cooling rate required during hot summer days.

SUMMARY OF INVENTION

This invention relates to method and system for transmitting storing and utilizing cold produced by natural cold ambient air and/or mechanical refrigeration, and more particularly, to method and system to store cold medium underground for subsequent cooling utilization during summers without relying on conventional air-conditioning systems.

The invention contemplates a novel system for transmitting, storing and utilizing cold which comprises means for transmitting cold produced by natural ambient air and/or mechanical refrigeration to freeze containers of water into ice in a chamber below the surface of the ground, and circulation means to circulate the air around the ice containers in the cold chamber to a ventilation duct for space cooling in an air-conditioning system.

For accomplishing the foregoing objective, the invention contemplates the use of natural cold ambient air and mechanical refrigeration for transmission of the cold to an underground cold storage chamber which contains a series of water containers. The water in the containers is cooled to extract heat therefrom and finally frozen during the cold seasons. The mechanical refrigeration equipment is used to aid the freezing process for regions having mild winters. In the present invention, natural cold ambient air and mechanical refrigerating equipment in this novel energy-saving cooling system is operated during the cold and cool seasons for ice generation.

The extraction of cold from the ice storage chamber for space cooling and cold storage is accomplished by blowing air through the passage between ice containers to the air-conditioning duct system. The returning warm air from rooms or other environment passes through the ventilation air duct, it then flows back to the ice storage chamber. In the process of air recirculation through the passage between ice containers in the storage chamber, the warm air is cooled by the ice in containers and the air circulation cycle repeated.

Accordingly, an important object of the invention is to provide for longduration underground storage of cold which can be used for space cooling and cold storage when air-conditioning is required.

Another important object of the invention is to provide a cold storage system using natural cold ambient air for ice making during cold seasons.

A further and important object of the invention is to provide a cold storage system using mechanical refrigeration for ice making during cold and cool seasons in regions even if freezing climate seldom exists.

A still further and very important object of the invention is to provide means for relieving the peak power demand on electric utility systems during the summer, thus reducing the considerable capital investments of the utility industry, and avoiding total blackout possibility in the community.

Yet another important object of the invention is to provide means for operating mechanical refrigerating equipment during cold and cool months, thus saving considerable electric energy for the users of air-conditioning equipment.

A still further object of the invention is to provide a highly efficient means for transmitting cold from a mechanical refrigerating system into the ground for cold storage through the use of cooling coils.

A still further object of the invention is to provide a series of containers containing water inside the cold storage chamber or reservoir which are spaced in a novel manner to allow air flow between them; thereby achieving a considerable increase in heat transfer rate between the cold air and water containers. This, in turn, increases the rate of ice forming.

A still further object of the invention is to provide direct air flow from the cold storage to an air-conditioning duct system without going through an inefficient heat exchanger.

A still further object of the invention is to provide a wide range of cooling energy on demand without installing over-sized compressor units.

A still further object of the invention is to provide a considerably warm water supply from heat recovery of the condenser discharge of the mechanical refrigeration unit.

A still further object of the invention is to provide means to make and store ice in an underground reservoir, thereby a considerble reservoir volume can be reduced for the same cold storage capacity of conventional beds of stones and rocks.

Further objects and advantages of my invention will become apparent from an understanding of the following detailed description of the preferred embodiments of my invention.

DESCRIPTION OF THE PREFERRED EMBODIMENT

FIG. 1 is a diagrammatic section view (top) of a system for transmitting, storing and utilizing cold by employing natural atmospheric cold and mechanical refrigeration equipment in accordance with the present invention.

FIG. 2 is a diagrammatic section view of a water-cooled condenser.

Referring to FIG. 1, the novel transmitting, storing and utilizing system of natural atmospheric cold and mechanical refrigeration equipment, generally indicated by number 10, includes an inlet duct 12, blower 2 and exit duct 14 for collecting and transmitting cold atmosphere above the ground into an insulated cold storage chamber 16, and discharging to atmosphere through duct 14. The mechanical refrigerating unit 11 consists of a compressor 13, powered by electric motor (not shown), a condenser 15 and cooling coils (evaporator) 17. The low-pressure refrigerant vapor from the cooling coils (evaporator) 17 passing through pipe 21 is induced into the compressor 13, which raises the vapor in pressure and temperature for delivery to the condenser 15. After heat removal (by circulating air or water) and condensation in the condenser, the liquid refrigerant passes first to a receiver (not shown) and next through the expansion valve 19 to the evaporator 17. In the evaporator 17, the liquid refrigerant, in vaporizing, absorbs heat from the water 26 in containers 30 before being inducted into the compressor 13.

Chamber 16 has water containers 30 with air passage 18 and cooling coils 17 adjacent to the containers 30. This chamber 16 may be located in any available space but, preferably, is located underground to take advantage of the natural earth temperature. The pit or chamber 16 is coated with a layer of foam synthetic plastics 20 and lines with insulation material 22 (styrofoam or the like), and the interior surface of the insulation 22 is lined with a plastic sheet barrier 24. The shape of the chamber 16 can be cylindrical, cubic or any other suitable form, and encloses a plurality of containers 30 containing water 26 and means for ice making. On the other hand, the chamber 16 can be prefabricated like concentric rigid shells with insulating material in between. The size and the skin thickness of the water containers 30 are determined by the heat transfer rate between the airflow air passage 18 outside the containers 30 and water 36 within. Furthermore, the material of the water containers 30 must have sufficient strength to withstand the hydrostatic pressure of water 26 and also sufficient elasticity to expand when water 26 freezes. The bottom and top and one alternative side of the containers 30 are tightly attached to the chambers 16 so that cold airflow can pass through the remaining three sides of the container 30 for effective heat transfer. The containers 30 are filled with water through the filling tubes 28 after the completion of the installation work of the chamber 16.

When the ambient atmospheric temperature reaches a few degrees below freezing temperature during the cold seasons, the blower 2 will be set in operation automatically by an electronic or electromechanical thermostatic control 32 which is connected to and activated by a temperature sensor 34 that monitors the ambient atmospheric temperature. The function of the blower 2 is to induce the cold ambient air from the inlet duct 12 into the chamber 16 for discharge through exit duct 14. The advantage of this exhaust flow system over the intake flow is that the heat generated by the blower 2 could not dissipate within the ice chamber 16. While the cold air passes along the large surface of the sides of the containers 30, it absorbs the heat from the water 26 in the containers 30. In this continuous process of heat transfer from the water containers 30 to the adjacent cold airflow, the water 26 in the containers 30 will eventually freeze within a cold season. This constitutes the freezing process of the ice storage chamber 16 in regions with sufficient cold climate.

When the ambient atmospheric temperature rises to a preset value, the blower 2 will be shut off automatically by the electronic control 32 with the aid of sensor 34. The open and closed positions of dampers 40 and 42 are automatically controlled by electronic control 32 which are synchronized with the "on" and "off" conditions of the blower 2, respectively. It is understandable that during the operational periods of blower 2, the dampers 44, 46 and 48 are always in the closed positions.

In regions where freezing climate seldom exists, the mechanical refrigerating unit 11 is put into operation. The mechanical refrigeration unit 11 will also put the blower 4 (disconnected from the house ventilation system in cool seasons) into operation simultaneously. The function of this blower 4 is to circulate the air in the passages 18 between water containers 30 in the ice storage chamber 16 through the closed conduit 50, 52 and 54 and back to the ice chamber 16. This circulation of air in a closed circuit would greatly increase the heat transfer rate between water 26 in the containers 30 and the cooling coils 17 adjacent to the containers 30 in the ice chamber 16. The desired duration of the operation period of the compressor 16 can be controlled by a time clock. When the mechanical refrigerating unit 11 is in operation, only damper 44 is set in open position.

In order to prevent the penetration of atmospheric heat to the ice storage chamber 16, a layer of insulating material is placed above to cover of the chamber 16. It is preferable that the insulating material be covered by a sheet of plastic which, in turn, is covered by a thick layer of soil (not shown). All the duct systems between ice chambers 16 and the air-conditioned environment are well insulated. At the bottom of the ice chamber 16, it is preferable to lay a few layers of gravel or rocks so that water from surrounding wet soil, if any, adjacent to the chamber 16 can be drained.

When it is desired to use the cold that has been stored in the ice chamber 16, the thermostatically controlled blower 4 (disconnected to the refrigeration unit 11 in hot seasons) will be set in operation. Simultaneously, the damper motor 38 sets dampers 46 and 48 open and damper 44 closed. The function of the blower 4 in this case is to deliver the chilled air in the ice-storage chamber 16 through supply ducts 50 and 56 to the air-conditioning ventilation system (not shown).

As the complete air-conditioning system in a cooling environment is in operation, the warm air from the returning duct 58 passes through duct 54 to the ice chamber 16 where the warm air is to be chilled by the ice containers 30. Then, the cooling process cycle is repeated. In order to regulate the required amount of cooling air entering the air-conditioning system, the damper 44 can be made partially open and damper 46 partially closed by the damper motor control 38. Alternatively, a variable-speed controlled blower (to replace blower 4) can also regulate the volume flow of the chilled air entering the air-conditioning system. Since the chilled air is directly drawn from the ice storage chamber 16 for cooling, the conventional liquid to the air heat exchanger can be eliminated in the present invention.

When the air-conditioned environment reaches a desired temperature by the cooling system, the blower 4 will be shut off automatically by an electronic or electromechanical thermometer control 36 which is connected to and activated by a temperature sensor 60 that monitors the temperature of the air-conditioned environment. As mentioned previously, the same thermostat control will start the blower 4 and damper motor 38 when the preset temperature of the air-conditioned environment is reached.

In order to save the initial costs of the cooling system of this invention, blower 2 and blower 4 can be replaced by a single one. This alternative blower can be placed in duct 21, between the ice chamber 16 and damper 42. In this case a more sophisticated yet still commercially available control device of the blower is required.

Heat generation from the compressor 13 to the condenser 15 is a source of energy recovery in this invention. The condenser 15 (in FIG. 2) is enclosed in a chamber 62 where forced circulation of water takes place. Cold city water (or other pumping means) enters the chamber 62 at the entrance pipe 64 and circulates around the finned tubes of the condenser 15 in order to extract heat generated from the compressor 13.

As a result, warm water flows out of the chamber 62 at exit pipe 66 to a storage tank (not shown) for hot water supply after reheating, if necessary.

While a preferred system and a preferred combination of natural atmosphere cold and/or mechanical refrigeration and water containers for use in such a system have been illustrated and described, it is to be understood that various changes and arrangements of parts may be made without departing from the spirit and scope of the invention as defined in the appended claims.

I claim:

1. A system for storing and utilizing cold comprising: a heat-insulated chamber (16), insulating means (22) surrounding said chamber for keeping ambient heat out of said chamber and for keeping cold from escaping from within said chamber; container means (30) placed within said chamber and containing therein a heat-transfer medium in the liquid phase form, said medium having the property of transforming from the liquid state to the solid state with the liberation of a substantially constant amount of heat and of transforming from the solid state to the liquid state with the absorption of substantially the same amount of heat; and dual means (2,11) for removing heat from said container means, said dual means comprising:
   a. circulation means (2) for circulating natural cold ambient air into said chamber around said container means, and finally, out of said chamber, so that the heat-transfer medium therein changes from the liquid to the solid phase; and
   b. refrigeration means (11) including a compressor (13), a condenser (15) and cooling coil means (17) containing a refrigerant, said cooling coil means removing heat from said heat transfer medium contained in said container means.

2. A system as in claim 1 wherein said chamber is located within the earth.

3. A system as defined in claim 1 including utilizing means which comprises duct means (56, 58) for circulating chilled air from said chamber (16) to a selected location to be cooled by said chilled air and then back to said chamber.

4. A system as defined in claim 1 including heat recovery means comprising a chamber (62) enclosing said condenser (15) and means passing through said chamber for removing heat from said condenser.

* * * * *